United States Patent
Scott et al.

(10) Patent No.: US 8,803,797 B2
(45) Date of Patent: Aug. 12, 2014

(54) INPUT THROUGH SENSING OF USER-APPLIED FORCES

(75) Inventors: James W. Scott, Cambridge (GB); Shahram Izadi, Cambridge (GB); Stephen E. Hodges, Cambridge (GB); Daniel A Rosenfeld, Seattle, WA (US); Michael G. Molloy, Caxton (GB)

(73) Assignee: Microsoft Corporation, Redmond, WA (US)

( * ) Notice: Subject to any disclaimer, the term of this patent is extended or adjusted under 35 U.S.C. 154(b) by 1678 days.

(21) Appl. No.: 12/016,786

(22) Filed: Jan. 18, 2008

(65) Prior Publication Data

US 2009/0184921 A1 Jul. 23, 2009

(51) Int. Cl.
*G09G 5/00* (2006.01)
(52) U.S. Cl.
USPC .......................................... 345/156; 345/174
(58) Field of Classification Search
CPC ..... G06F 3/016; G06F 3/0202; G06F 3/0414; G06F 2200/1636; G06F 2200/1637
USPC ...................... 345/137–178; 178/18.01–18.07
See application file for complete search history.

(56) References Cited

U.S. PATENT DOCUMENTS

| | | | |
|---|---|---|---|
| 5,369,228 A | 11/1994 | Faust | |
| 5,708,460 A * | 1/1998 | Young et al. | 345/173 |
| 6,211,860 B1 | 4/2001 | Bunsen | |
| 6,243,075 B1 * | 6/2001 | Fishkin et al. | 345/156 |
| 6,297,810 B1 * | 10/2001 | Anderson | 345/173 |
| 6,573,464 B2 | 6/2003 | Yen | |
| 6,801,191 B2 | 10/2004 | Mukai et al. | |
| 7,133,026 B2 | 11/2006 | Horie | |
| 7,138,977 B2 | 11/2006 | Kinerk et al. | |
| 7,456,823 B2 * | 11/2008 | Poupyrev et al. | 345/173 |
| 2004/0233158 A1 | 11/2004 | Stavely et al. | |
| 2006/0107762 A1 | 5/2006 | Sandbach et al. | |
| 2007/0242037 A1 | 10/2007 | Son | |
| 2008/0018596 A1 * | 1/2008 | Harley et al. | 345/157 |

FOREIGN PATENT DOCUMENTS

WO    WO2006024554 A3    3/2006

OTHER PUBLICATIONS

"FlexiGesture", retrieved on Nov. 27, 2007, at <<http://www.media.mit.edu/resenv/amc/>>, pp. 1-2.
Harrison, et al., "Squeeze Me, Hold Me, Tilt Me! An Expploration of Manipulative User Interfaces", CHI, Apr. 1998, pp. 17-24.
Kirovski, et al., "The Martini Synch", Technical Report MSR-TR, Sep. 2007, pp. 1-16.
Kudurshian, "Techniques in Improving Scrolling on Handheld Devices", pp. 1-8.

(Continued)

*Primary Examiner* — Vijay Shankar
(74) *Attorney, Agent, or Firm* — Pablo Tapia; Jim Ross; Micky Minhas

(57) ABSTRACT

Methods and devices for providing a user input to a device through sensing of user-applied forces are described. A user applies forces to a rigid body as if to deform it and these applied forces are detected by force sensors in or on the rigid body. The resultant force on the rigid body is determined from the sensor data and this resultant force is used to identify a user input. In an embodiment, the user input may be a user input to a software program running on the device. In an embodiment the rigid body is the rigid case of a computing device which includes a display and which is running the software program.

19 Claims, 10 Drawing Sheets

(56) References Cited

OTHER PUBLICATIONS

"Mobile Gazette", at <<http://www.mobilegazette.com/siemens-cx70-emoty.htm>>, Sep. 13, 2004, pp. 1-2.

O'Modhrain, "Touch and Go—Designing Haptic Feedback for a Hand-Held Mobile Device", BT Technology Journal, vol. 22, No. 4, Oct. 2004, pp. 139-145.
Schwesig, et al., "Gummi: A Bendable Computer", ACM, vol. 6, No. 1, 2004, pp. 263-270.

* cited by examiner

FRONT VIEW

END VIEW

INPUT THROUGH SENSING OF USER-APPLIED FORCES

BACKGROUND

Many mobile computing devices, including smart phones, tablet PCs and PDAs, have a screen which covers most, if not all, of the front surface of the device. The larger screen makes it easier to present information to the user but this leaves little or no room for user input buttons, such as a numeric or alphanumeric keypad or for dedicated buttons for particular tasks. One solution to this is for the screen to be touch sensitive and for a portion of the touch sensitive screen to be used for soft buttons (e.g. to provide the numeric or alphanumeric keypad). However, the area which is used for touch input reduces the overall area which is available for information presentation and also, the user may obscure a portion of the display whilst pressing the soft buttons.

The embodiments described below are not limited to implementations which solve any or all of the disadvantages of known user input means.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and devices for providing a user input to a device through sensing of user-applied forces are described. A user applies forces to a rigid body as if to deform it and these applied forces are detected by force sensors in or on the rigid body. The resultant force on the rigid body is determined from the sensor data and this resultant force is used to identify a user input. In an embodiment, the user input may be a user input to a software program running on the device. In an embodiment the rigid body is the rigid case of a computing device which includes a display and which is running the software program.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
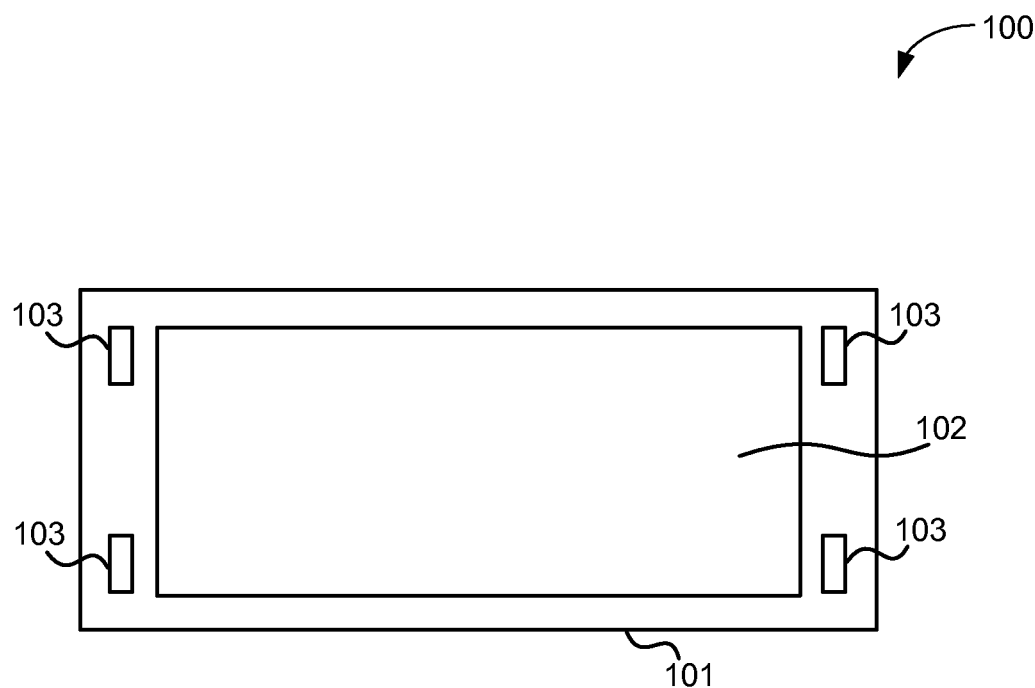
FIG. 1 is a schematic diagram of a computing device which allows user input through application of forces to the device.

FIG. 1 is a schematic diagram of a computing device 100 which allows user input through application of forces to the device. The device comprises a substantially rigid body 101, a display 102 and one or more force sensors 103. A user can provide inputs to software running on the device by applying forces to try to compress, stretch or bend the device; however as the body of the device is rigid, there is little or no actual deformation of the device. These applied forces are detected using the one or more force sensors 103.

The computing device 100 may be any type of computing device, including but not limited to, a tablet PC, a handheld PC, an ultramobile PC (UMPC), a mobile telephone, a games console and a PDA (personal digital assistant). The substantially rigid body 101 of the device may be sufficiently rigid that standard rigid electronic assembly methods and materials may be used (e.g. standard rigid PCB rather than a flexible substrate, LCDs with a rigid plastic/glass cover layer rather than a flexible display, etc). The display 102 may be a touch sensitive display, may enable user input with a stylus or may not enable user input via the display. The force sensors 103, which may be within or on the rigid body, may be any type of force sensors, such as strain sensors, pressure sensors and piezoelectric sensors. Further examples of sensors, such as those which use optical effects or displacement of a fluid, are described in more detail below.

Figure 2:
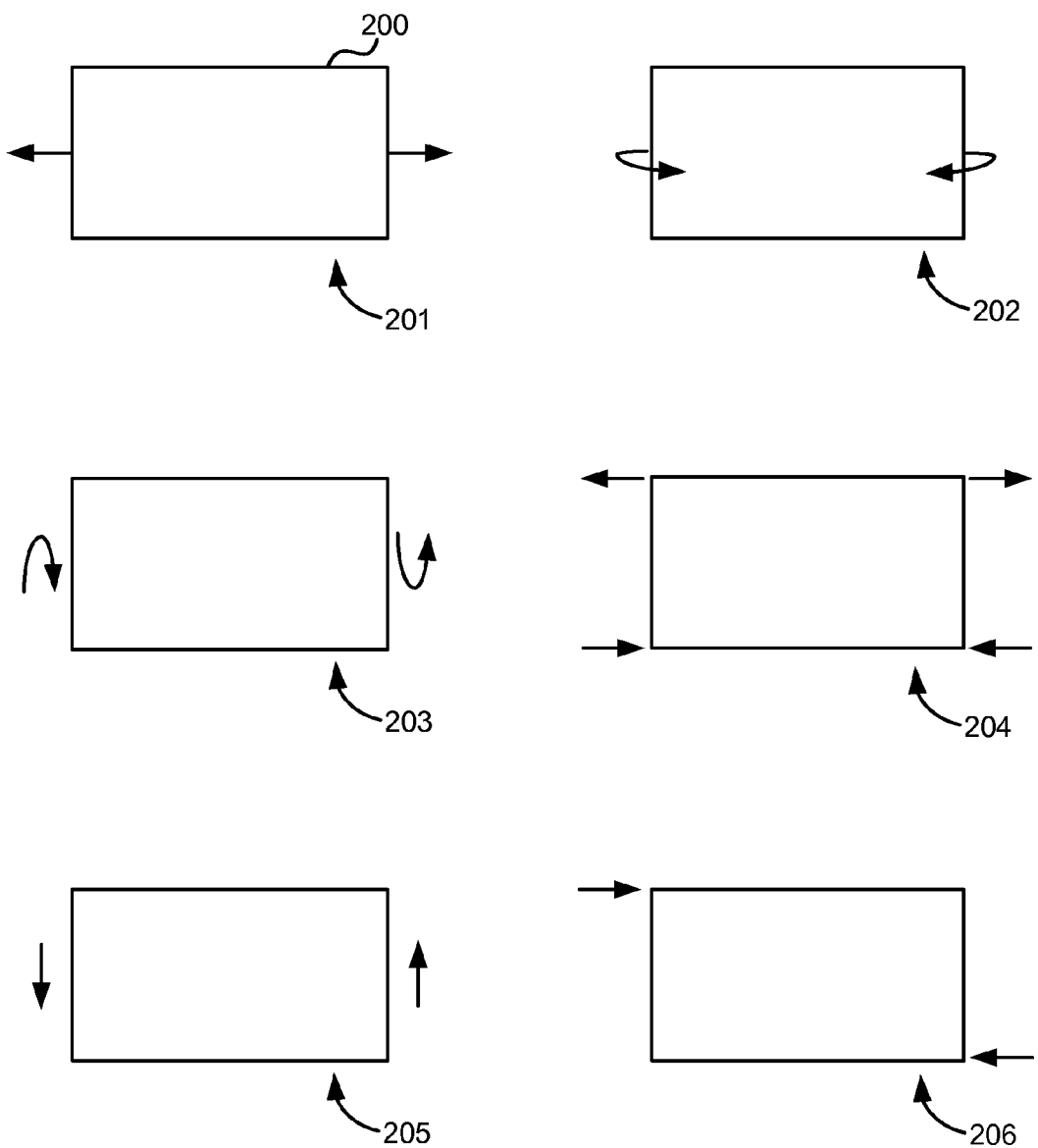
FIG. 2 shows a number of different examples of forces which may be applied to the rigid body of a computing device.

FIG. 2 shows a number of different examples of forces which may be applied to the rigid body of a computing device 200. A first example, 201, shows stretching forces and the opposite of this would be compressing forces (not shown in FIG. 2). Other examples show bending/folding (example 202) and twisting/unscrewing (example 203). The next example, 204, shows a bending action where the device is compressed along one edge and stretched along the parallel edge (which may be referred to as 'steering'). The final two examples 205, 206 show shearing forces. Further examples exist which correspond to the opposite forces to those shown in FIG. 2 (e.g. compressing forces are the opposite of that shown in example 201). When these forces are applied to a rigid body by a user, the forces are transmitted throughout the body and components of the resultant force on the body as a whole may be detected by the force sensors. A device may support some or all of these forces as user input techniques and different forces may correspond to different inputs and result in different actions by software running on the device. This is described in more detail below with reference to FIG. 3. The forces applied to the device by a user (e.g. as shown in FIG. 2) may also be referred to as 'user actions'. The examples shown in FIG. 2 are forces which may be applied by a user using two hands. In some examples, a user may apply forces using one hand or using one hand but supporting the device on a surface or other device.

The term 'resultant force' is used herein to refer to the overall forces experienced by the body of the device as a result of the user actions on the device. Many different user actions may result in the same resultant force pattern, for example, the twist action (example 203) may be applied to a device in multiple different places and with many different hand placements but still result in the same resultant force on the device. The one or more force sensors in (or on) the device each detect components of the resultant force and may therefore be detecting indirectly the effect of the user's actions. This is distinguished from use of a push button as a user input, which detects the user's pressure directly and detects pressure on the button itself, rather than being transmitted through the device.

Figure 3:
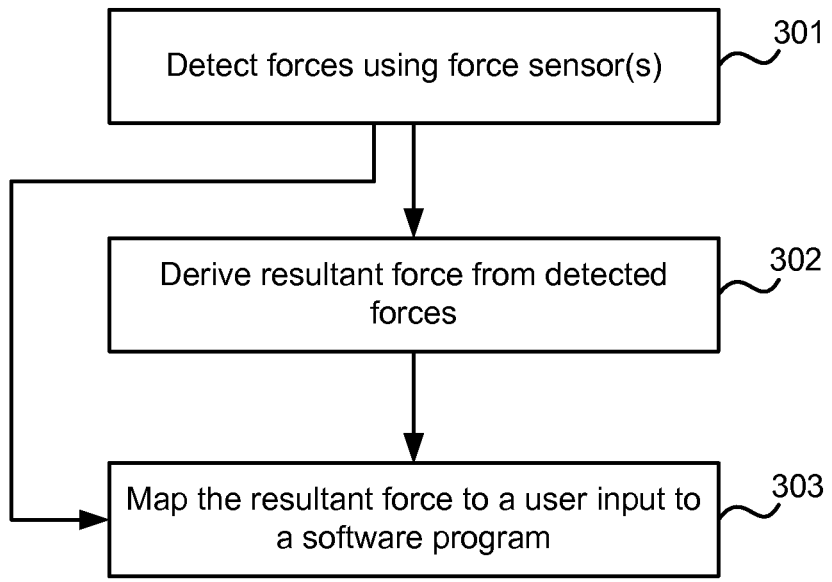
FIG. 3 shows a flow diagram of an example method of operation of the computing device shown in FIG. 1.

FIG. 3 shows a flow diagram of an example method of operation of the computing device 100 shown in FIG. 1. When a user applies forces to the rigid body of the device, as if to deform the device's structure, the forces are transmitted through the body of the device and components of the resultant force on the body are detected by the force sensor(s) 103 (block 301). Dependent on the type of sensor used, a single sensor may be able to detect more than one component of the resultant force (e.g. the optical sensor described below with reference to FIG. 8 detects the overall force map within the device). The resultant force is then mapped to a user input (block 303), which may be a user input for software running on the device. The resultant force which is mapped to a user input (in block 303) may be a directly measured resultant force or a derived resultant force. In the example where a derived resultant force is mapped to a user input, the outputs of the force sensors may first be analyzed, using knowledge of the device materials and/or design, to determine the resultant force experienced by parts of the device other than where the sensors are located (block 302). For example, the sensors in a device may be arranged around the edge of the display (e.g. as shown in FIG. 1), however the resultant force at the center of the display may be inferred from the detected values and this derived resultant force mapped to a user input.

These user inputs may trigger any action within the software and examples of actions which may be triggered include:
  Image manipulation, such as zooming in/out, rotation, pan or tilt
  Media related actions, such as play, pause, fast forward, rewind, skip or stop
  Window actions, such as scrolling, changing the active window, maximize, minimize, close window or open a new window
  Document or file management actions, such as save, print, delete or send
  Actions related to games of any type (e.g. platform games, first-person-perspective games etc)
  Global actions, such as Escape, Alt-tab, Windows tab, Page Up/Down In other examples, the user inputs may be used to control the position of a cursor (e.g. as a mouse replacement), for example the cursor may gravitate to the position on the display which corresponds to the point of the maximum force within the device. If suitable software is run on the device (e.g. Dasher as developed at the Cavendish Laboratory, Cambridge, UK), the forces applied by a user may be used as a text input means (e.g. with the applied forces controlling the position of a cursor).

The resultant force may be defined in terms of a number of input force primitive actions, such as those shown in FIG. 2 (where there are 12 actions, the six shown plus the six opposite actions), or in terms of a number of axes (e.g. one compressing/stretching, three twisting and two shear) with each axis corresponding to an action shown in FIG. 2 and its opposite action (not shown). Where axes are used, the system may detect the user's force along each of the axes and use these to determine the actions. Use of axes, or similar method, to describe the resultant forces may enable the magnitude of the forces applied to be taken into consideration and also eases the detection and interpretation of compound user actions (e.g. compressing and twisting).

The different actions (and resultant forces) that can be detected by a particular device will be dependent upon the arrangement of force sensors in that device (as described below in relation to the example of FIG. 6). A particular device may be designed to detect a subset of all possible input force primitive actions and therefore the sensor arrangement may be designed to be able to detect only those forces (e.g. using a reduced number of force sensors compared to those required to detect all possible input forces).

The mapping between the resultant force and the user input (in block 303) may be performed within a custom software module (e.g. like a device driver) or may be performed within the operating system (OS) running on the device or within the software application which is being controlled through the force-based inputs. Where the resultant force is derived (in block 302), the analysis required to derive the resultant force may also be performed within a custom software module, the OS, an application or any other software module.

The device and method described above enable the software running on a device to be controlled through the resultant force applied by a user to that device. The resultant force is determined from the sensory inputs from all the force sensors. In some examples, the device may comprise a single sensor and in this example, the resultant force is determined from the sensory input from the single sensor.

Figure 4:
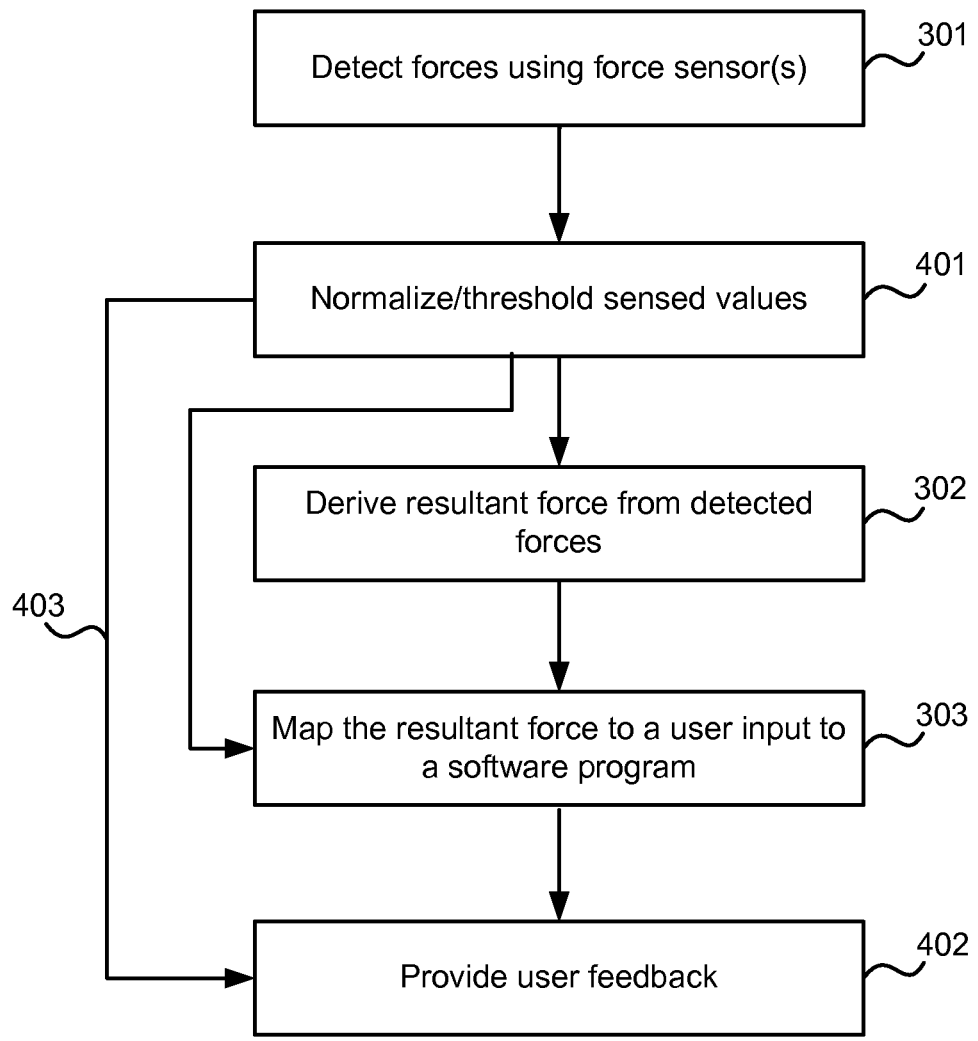
FIG. 4 shows a flow diagram of a second example method of operation of the computing device shown in FIG. 1.

FIG. 4 shows a flow diagram of a second example method of operation of the computing device 100 shown in FIG. 1. Prior to mapping the resultant force (block 303), or inferring a derived resultant force (block 302), where implemented, the sensory inputs from the force sensors may first undergo some processing (block 401). This processing may involve thresholding and/or dynamic calibration and these aspects are described in more detail below.

The thresholding process may screen out those applied forces (or sensory inputs from force sensors) which are below a minimum defined level. This avoids detection of force-based inputs from general handling or transporting of the device or other forces which result from non-deliberate actions. Where forces are detected which are below the minimum defined level, these forces are not mapped to user inputs.

The dynamic calibration process is intended to accommodate variations in the sensor response which may occur over time. These variations may be caused by changes in temperature, ageing or any other factor. The calibration process may also normalize the force levels expected from a human user (e.g. rather than vibrations transmitted through a surface on which the device may be resting). The dynamic calibration may be performed through user input (e.g. to indicate the 'zero applied force' position when the user is not attempting to flex the device) or by analyzing the sensed values. For example, the analysis may determine where the sensed values have stayed substantially the same for a long period of time (i.e. the sensed values remain substantially static) and this value (or an average thereof, where there is small variation)

may then be set as the 'zero applied force' position. Any high frequency components of the sensed values may also be filtered out in some embodiments (e.g. at frequencies above the likely input frequencies of a user) so as to filter out noise in the signal. The resetting of the 'zero applied force' position may be implemented, for example, through use of a calibration factor or alternatively through varying the threshold which is applied in the thresholding process (described above). The dynamic calibration process (in block 401) may also be used to adjust the sensed values so that the sensory inputs from all the force sensors, which may include force sensors of different types, have a similar range of values.

In addition to, or instead of screening out small forces (e.g. resulting from handling etc), the thresholding process (in block 401) may flag those force inputs which are too large and exceed a maximum defined level. Detection of such a force may result in immediate feedback to the user (block 402, e.g. audible, visual and/or haptic feedback), as indicated by arrow 403, to warn that the device is being mistreated and there is a risk that the device may be damaged. User feedback (in block 402) may, in addition or instead, be provided to indicate that the force applied has been mapped to an action.

The user feedback (in block 402) may be provided audibly (e.g. through use of a beep), visually (e.g. through use of a LED or icon on the screen) or haptic feedback may be provided. Where haptic feedback is provided, this may, for example, be provided through vibration of the device using a vibrating mechanism or loudspeaker within the device. Visual feedback may also be provided through the user observing changes in the graphical user interface, i.e. by observing the action (or the effect of the action) within the software being controlled that occurs as a result of the user input.

Whilst FIG. 4 shows both the dynamic calibration and thresholding processes (block 401) and the provision of user feedback (block 402), other example methods may include only one of these elements, or may only use some of the aspects of dynamic calibration and thresholding described above.

Figure 5:
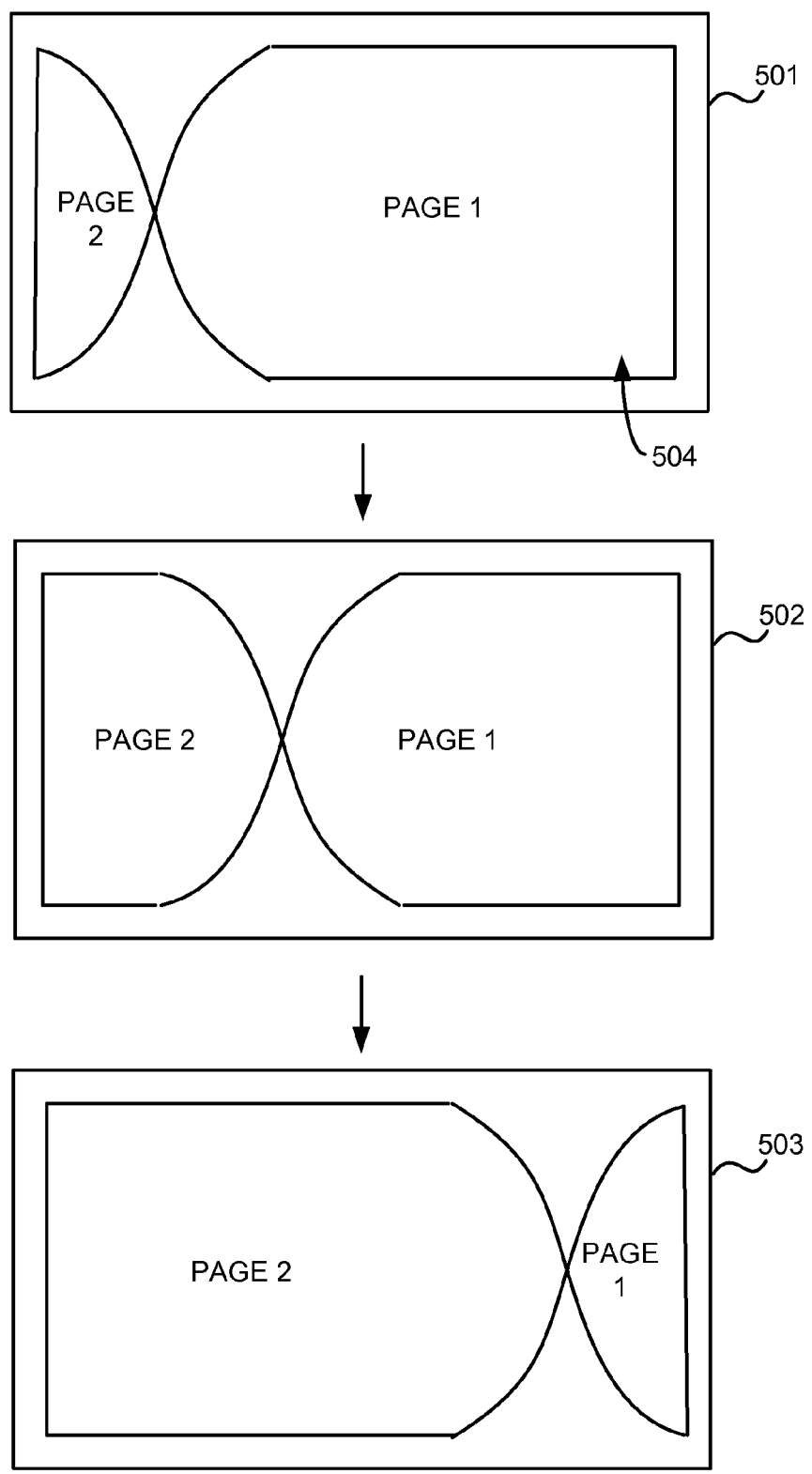
FIG. 5 shows an example animation in a graphical user interface.

In order to make the user interaction intuitive and to reinforce the mapping between applied forces (or user actions) and the resulting actions within a software application, animations/transitions may be used which reflect in some way the user action which initiated it (or the resultant force that the user applies). For example, if 'fold' and 'unfold' user actions (as shown in FIG. 2 example 202 and its opposite (not shown)) are mapped to user inputs which correspond to showing the next/previous picture in a photo gallery, the pictures may transition by folding up and disappearing so that the next picture is visible, or by flying in and unfolding so that the previous picture is visible. In another example, where the twist action by the user (as shown in FIG. 2 example 203) is mapped to the 'next page' user input, the transition between pages may be displayed on screen as the new page twisting in to replace the old page (e.g. from left to right), as shown in the sequence of images 501-503 in FIG. 5. In the first image 501, as the user starts to apply a twisting force to the device body, the second page 504 starts to appear from the left. As the twisting continues, the amount of the second page which is visible increases (images 502-503). In another example, the page may twist on both sides, so that the next page appears as a portion which grows to ultimately displace the original page.

The user input to the software program and the animation/transitions used may vary according to the magnitude of the forces applied by the user. Using the example shown in FIG. 5, a larger twisting force applied by the user may result in the transition occurring faster (e.g. the sequence of images 501-503 occurs more quickly). In another example, where a particular resultant force maps to a scrolling action in a software program, the scrolling speed may be related to the magnitude of the resultant force applied by the user to the device. In a further example, where a particular resultant force is mapped to a 'skip forward' action in a software program (e.g. in a photo gallery application), the size of the step (e.g. one image or multiple images) may be related to the magnitude of the force applied by the user.

In one example implementation of the use of animations which reflect the forces applied by the users, a polygon mesh may be created and then deformed by applying forces to it which are representative of the forces applied by the user. The resultant deformed mesh may be used in rendering the graphical user interface on the display of the device. The animations provided may use 2D or 3D visual display technology.

Figure 6:
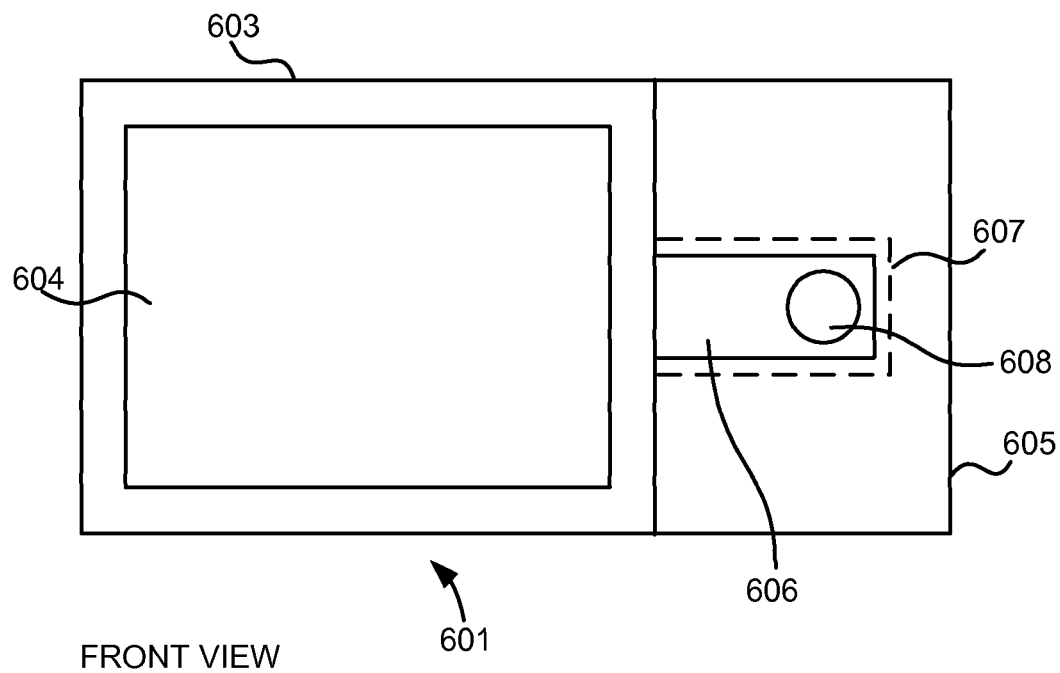
FIGS. 6 and 7 are schematic diagrams of further computing devices which allow user input through application of forces to the device.
Figure 6:
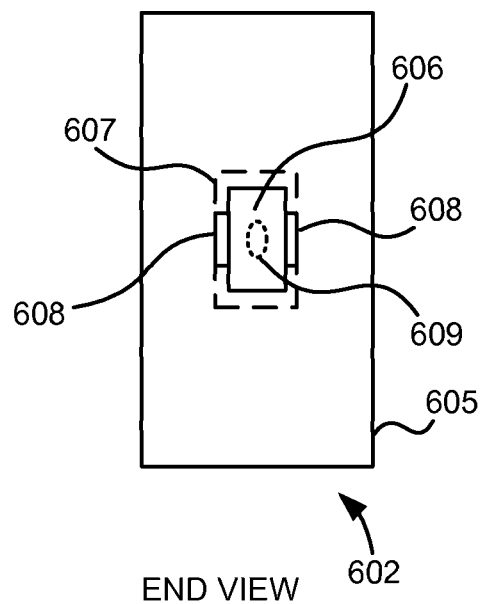
Figure 7:
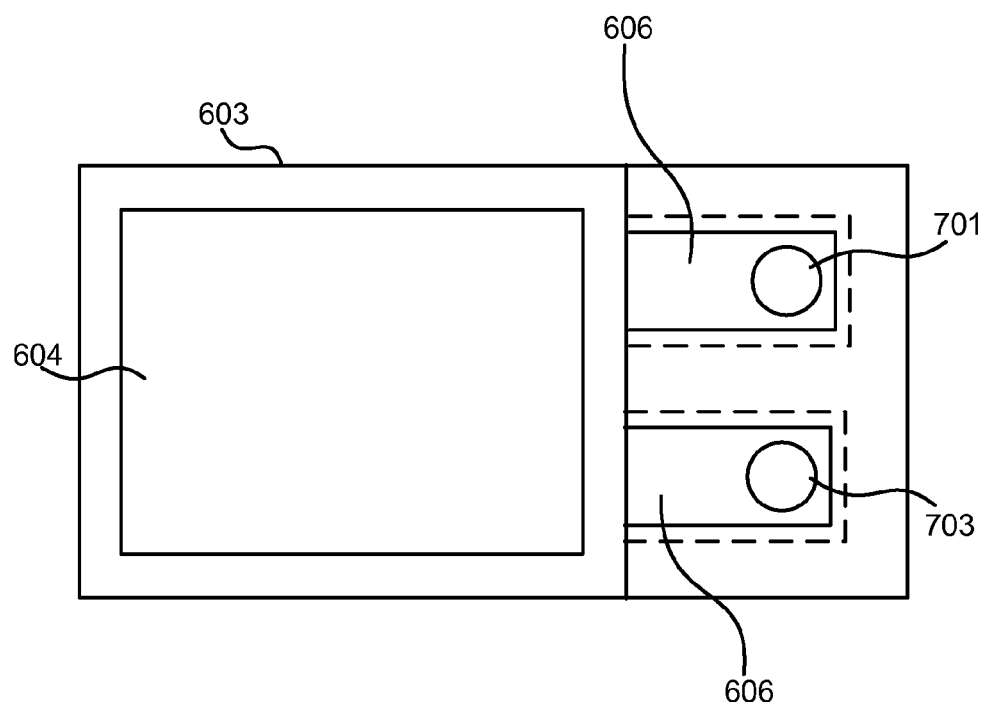
Figure 7:
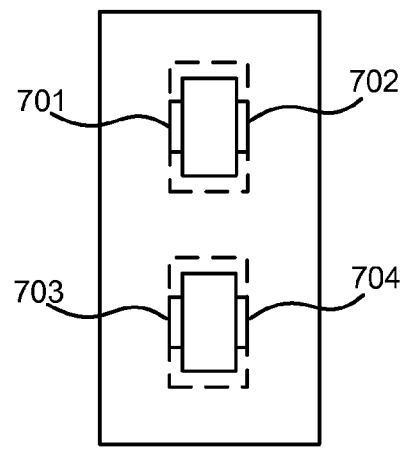

FIG. 6 shows a schematic diagram of a computing device which allows user input through application of forces to the device. Two views are shown: a front view 601 and an end view 602. The device comprises a main portion 603, which comprises the display 604, and an end portion 605 which may be fixed to (and in some examples may be integrated with) the main portion. A rigid protruding member 606 is fixed to the main portion at one end and protrudes into a cavity (indicated by dotted line 607) within the end portion. One or more force sensors 608 are located on the protruding member. When forces are applied to the device by a user (e.g. by a twisting action as shown in example 203 of FIG. 2), the forces are transferred through the device to the force sensors 608 and can be detected. FIG. 7 shows a schematic diagram of another computing device which is similar to that shown in FIG. 6 but includes two protruding members 606 and four force sensors 701-704.

In the examples shown in FIGS. 6 and 7, the different user actions can be determined by analysis (e.g. by comparison) of the detected components of the resultant force (which may be determined from a change in detected forces where the sensors are pre-loaded) at each of the force sensors 608. In a simplified example, in FIG. 7 (where a 'High' sensory input corresponds to a higher detected force than a 'Low' sensory input):

| Sensory input from sensor 701 | Sensory input from sensor 702 | Sensory input from sensor 703 | Sensory input from sensor 704 | Resultant force/user action |
| --- | --- | --- | --- | --- |
| High | Low | High | Low | Folding (as in example 202 of FIG. 2) |
| High | Low | Low | High | Twisting (as in example 203 of FIG. 2) |
| Low | High | Low | High | Folding (the opposite of example 202 of FIG. 2) |
| Low | High | High | Low | Twisting (the opposite example 203 of FIG. 2) |

Depending on the number, position and type of force sensors used, different user actions (and resultant forces) may be detectable and distinguishable. In another example, additional force sensors may be added to the devices shown in FIGS. 6 and 7 such that there are force sensors on the ends of the protruding members 606, as indicated by the dotted circle 609 in the end view 602 of FIG. 6. By adding these additional sensors, the device may also be able to distinguish compression/stretching (example 201 of FIG. 2 and its opposite) and other user actions.

In an example, the end portion 605 may be retrofitted to an existing device 603. The end portion may, for example, be made from acrylic and the protruding members may be metal (e.g. aluminum). In such an example, the protruding members may be fixed to the main portion using an adhesive, screws or other fixing means and the end portion may be slotted over the protruding members (and may or may not be fixed to either the protruding members or the existing device), so that forces applied to the end portion or to the entire device (end portion and existing device) are concentrated on the intersection between the protruding members and the end portion.

The devices shown in FIGS. 6 and 7 are just two example implementations and in other implementations more/fewer sensors may be used and the sensors may be located in different positions etc.

In another example, an existing device may be mounted on a rigid plate (e.g. made from acrylic sheet) which is fixed to (or integral with) the end portion or the existing device may be fixed to a substantially rigid plate with force sensors integrated within it or on its surface. In a further example, an additional skin/casing may be provided which fits around an existing device and which includes the force sensors and which may be removable.

Where the force sensors are not integrated within a device, interface electronics may be provided external to the device (e.g. within the skin or attached to the plate to which the device is fixed). The interface electronics provide an interface between the force sensors and the device itself and may provide inputs to the device using a USB port or any other connection means (e.g. a proprietary connector on a mobile phone, IrDA, Bluetooth etc). The interface electronics may include an analyzer which infers the resultant force (block 302 of FIG. 3). The interface electronics may also map the resultant force to a user input (block 303 of FIG. 3). Alternatively, the interface electronics may provide the raw sensory signals to the device which may perform the analysis and interpretation (blocks 302-303).

The force sensors may be integrated within a computing device or fixed to (e.g. mounted on) a computing device. The sensors may be retrofitted to an existing device or may be integrated within a new device and a number of example implementations for retrofitting sensors to an existing device are described above. Irrespective of whether the device is integrated or not, the sensors are located (and/or the device designed) such that the forces applied by the user are transferred to the sensors such that they can be detected.

The force sensors used (and any associated sensing circuitry) may detect an absolute value (e.g. absolute strain) or may detect a change in applied force. For example, the arrangement of sensors shown in FIGS. 6 and 7, with pairs of sensors 608, 701-704 on either side of a protruding member 606 may be replaced with a pre-loaded sensor on one side of the protruding member in place of each pair and the direction of the force applied may be determined from the change in load on the sensor. The values sensed by the force sensors may, for example, be representative of the maximum force on any part of the sensor or may be representative of the sum of the forces on the sensor.

As described above, any suitable force sensor(s) may be used, including, but not limited to, strain sensors, pressure sensors, MEMS (microelectromechanical systems) sensors and piezoelectric sensors. Many strain sensors and pressure sensors make use of the change in conductivity of particular materials under strain, such that the resistance of the sensor changes as a result of applied strain/pressure, whilst piezoelectric sensors generate a current in response to an applied force. Other examples include cells which include a trapped fluid and the pressure of this fluid is detected by sensors at the edge of the fluid chamber. Such cells enable the actual sensors (which detect the pressure of fluid) to be located remotely from where the pressure is actually applied. Vibrational effects may also be used to detect strain, e.g. using a surface acoustic wave (SAW) or by measuring how sound propagates through an object. A camera may also be used to detect the resultant force. Whilst there may only be a small amount of displacement of the body of the device, this small movement may be detected using a visible light (or other wavelength of electromagnetic radiation) reflect off a surface of the body and detected by a camera. Optical effects may also be used to detect applied forces, as shown in the example of FIG. 8.

Figure 8:
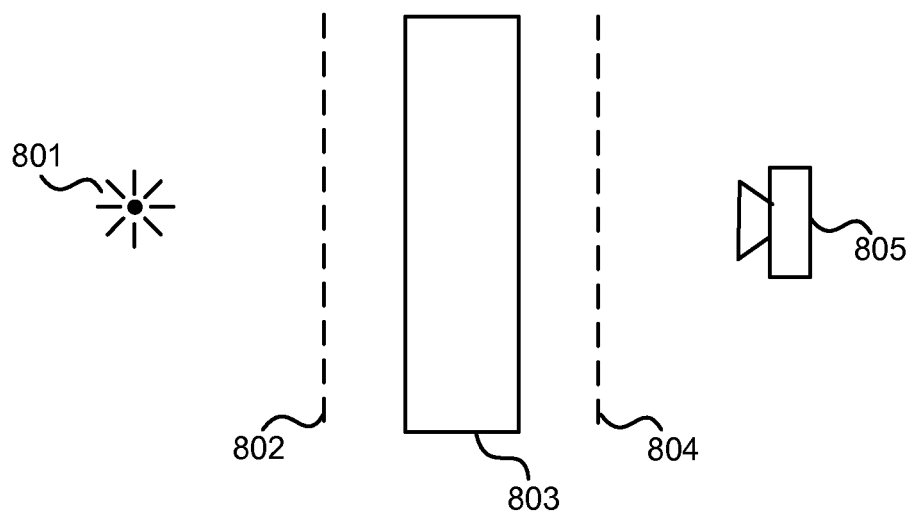
FIGS. 8 and 9 show schematic diagrams of arrangements for sensing applied forces using polarized optical distortion.
Figure 9:
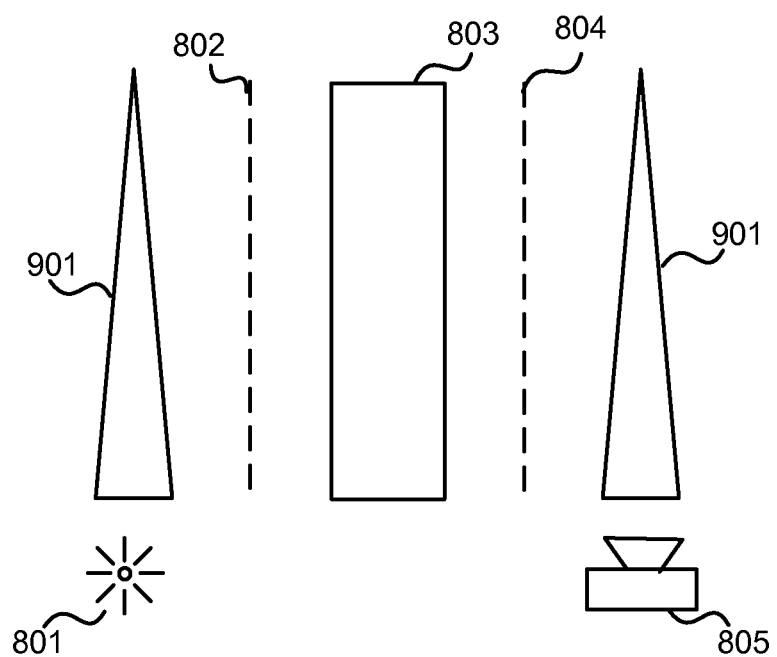

FIG. 8 shows a schematic diagram of an arrangement for sensing applied forces using polarized optical distortion. A polarized light source (which may comprise a light source 801 and polarizer 802) projects polarized light through a polymer sheet 803, which may, for example, be a polycarbonate or acrylic sheet. Having passed through the polymer sheet 803, the light passes through a polarizer 804 and is detected (e.g. using a camera system 805). Any suitable sheet may be used where the effect on the polarization of light when passing through it is related to the amount of stress in the material. When forces are applied by a user to the polymer sheet 803, the optical polarizing properties of the sheet change such that the amount of rotation of polarization of the light passing through any part of the sheet is dependent on the strain (i.e. different parts of the sheet will experience different strain which will result in a different change to the polarization of light passing through it). As a result, the detected image provides a map of the strain on the sheet which may be interpreted to determine the user action (or resultant force) which caused it. In order to make the optical train of the sensing arrangement in FIG. 8 more compact, optics such as the Wedge® 901 developed by CamFPD may be used, as shown in FIG. 9.

In the above description, the user applies the forces to the rigid body of the device which is displaying and running the software application (e.g. device 100 as shown in FIG. 1). However, in some implementations the forces may be applied to a proxy device which is associated with the device running the software application or may be applied to the rigid body of a display which is associated with a separate computing device. This enables force-based inputs to larger devices, such as desktop PCs. In a first example, a user may apply forces to the rigid body of an LCD which displays the GUI generated by a desktop PC or may apply the forces to the rigid body of any other device associated with the desktop PC (e.g. keyboard, mouse etc), or a separate proxy device with no other function. These forces applied by the user may be used to control the operation of software running on the PC (e.g. the OS or application software) as described above. Where a proxy device is used, this may be a dedicated force-based user input device, which may have a rigid body and integrated force sensors (e.g. as in FIG. 1 but without the display 102), or may be any device associated with a computing device (e.g. a keyboard, stylus etc). The proxy device may communicate with the computing device running the software which is being controlled using any suitable communication technology which may include both wired (e.g. USB) and wireless (e.g. Bluetooth or IrDA) technologies. The proxy device and the computing device may, in some examples, be connected via a network (e.g. the internet, an intranet, a local area network or a cellular telephone network).

As described above, a user may use one or both hands (or a few fingers) to apply the forces which are mapped to user inputs and FIG. 2 shows some examples of forces which may be applied using two hands. In some implementations, however, forces may be applied by more than one person to the same device or to proxy devices associated with the same computing device. This may be particularly applicable in the field of gaming, where several players who are playing together may all interact with the game using force-based inputs. In such an embodiment, the forces may be applied to the rigid cases of games controllers which may have integrated or retrofitted force sensors and where each player (or each player playing at any one time) has their own games controller. In another example, many users may simultaneously apply forces to the same rigid body, e.g. to the rigid body of a large touch sensitive display. The resultant force on the body may be interpreted as described above and used to provide user input to the games console or other computing device which is running software which is being controlled by the force-based inputs.

The rigid body of a device to which forces are to be applied, whether a computing device or a proxy device, may be shaped to assist in the application of forces. For example, the rigid body (or the retrofitted skin or other device) may be provided with grip regions or handles. In the large touch sensitive display example above, the edges of the display may be provided with grip regions for each of the users.

The user actions which are detected and interpreted as described above may be single actions (e.g. any one of the actions shown in FIG. 2 or their opposites) or may be compound actions (e.g. combinations of actions shown in FIG. 2 or sequences of actions). The force-based actions by a user may also be combined with other actions, e.g. in combination with a key press (whether a hard or soft key) or with tapping of the device on a surface. These other actions may be detected using other sensors associated with the device (e.g. vibrational sensors, contact sensors, pressure switches at the corners, accelerometers etc).

Figure 10:
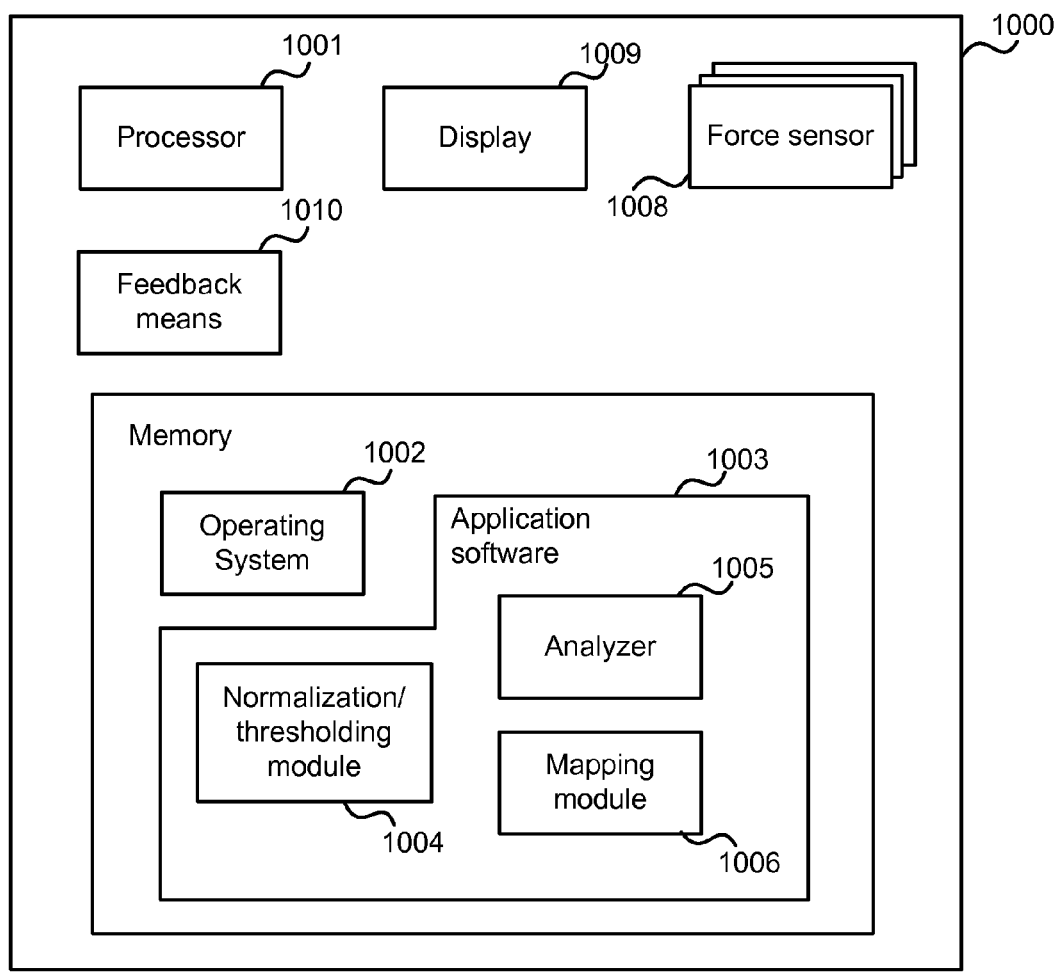
FIG. 10 illustrates an exemplary computing-based device in which embodiments of the methods described herein may be implemented.

FIG. 10 illustrates various components of an exemplary computing-based device 1000 which may be implemented as any form of a computing and/or electronic device, and in which embodiments of the methods described above may be implemented.

Computing-based device 1000 comprises one or more processors 1001 which may be microprocessors, controllers or any other suitable type of processors for processing computing executable instructions to control the operation of the device in order to detect and interpret forces applied to the device (or to a proxy device) by a user. Platform software comprising an operating system 1002 or any other suitable platform software may be provided at the computing-based device to enable application software 1003 to be executed on the device. The application software may include a normalization/thresholding module 1004, an analyzer module 1005 arranged to determine the resultant force applied to the device and a mapping module 1006. As described above, the mapping (block 303 of FIG. 3) may alternatively be integrated within the operating system 1002 or other application software.

The computer executable instructions may be provided using any computer-readable media, such as memory 1007. The memory may be of any suitable type such as random access memory (RAM), a disk storage device of any type such as a magnetic or optical storage device, a hard disk drive, or a CD, DVD or other disc drive. Flash memory, EPROM or EEPROM may also be used.

The computing-based device 1000 also comprises one or more force sensors 1008 and a display 1009. The device may also comprise feedback means 1010 to enable feedback to be provided to the user if the forces applied exceed a threshold or to confirm that a user action has been mapped to a user input (as described above). This feedback means may provide audible, visual, haptic, or any other type of feedback and may comprise any suitable means for providing such feedback, including but not limited to, a sound generator (or buzzer), a vibrating element, a loudspeaker or an LED. Where visual feedback is provided, the feedback means 1010 may be the display 1009. The device 1000 may also comprise one or more inputs (not shown in FIG. 10) which may be of any suitable type for receiving media content, Internet Protocol (IP) input, etc. The device may also comprise communication interface (also not shown in FIG. 10). One or more outputs may also provided be such as an audio output (which may also be used to provide audible user feedback).

Whilst the device of FIG. 10 is shown as a single device which includes the force sensors, where a proxy device or retrofitted skin/module is used (as described above), elements of device 1000 may be included within the proxy device (e.g. force sensors 1008) and a communications interface (not shown) may be used to communicate between the main device and the proxy device. As described above, the proxy device may also include the display 1009.

There are many different applications of the force-based input methods and apparatus described above. As described above, the force-based inputs may be used as a button replacement. The inputs may be used as a language input method by, for example, controlling the position of a cursor over an image of a keyboard or by using forces to control scrolling letters. Different user actions may be used to change the letter shown under the cursor and to select a letter. In another example, a 2D scroll system may be controlled using force-based inputs for input of alphanumeric characters or software such as Dasher may be used. Additionally, as the force-based user inputs are not easily determined by a third party observing the user, the inputs may be used to provide secret information, such as an identification code (analogous to a PIN). A user may define a particular sequence of force-based inputs (e.g. a sequence of actions shown in FIG. 2) as their identification code. In another example, the force-based inputs may be used to provide a security key to enable devices to securely connect to each other. If the same force-based input is applied by a user simultaneously to two devices (e.g. by holding them together and manipulating them as one), each device will detect the same resultant force and this can be used to securely identify the devices involved. This may be used in a manner analogous to the Martini Synch, (as described in Microsoft® Technical Report MSR-TR-2007-123), which uses an accelerometer to create a secret handshake by waving devices in tandem.

Use of force-based inputs enables development of computing devices which do not require any holes in the rigid case for physical buttons. This provides a sealed device which is more robust and provides no ingress points for dust, liquid and other debris. Whilst in office environments this may not add particular value, this may be beneficial for outdoor use or in harsh environments. The lack of a requirement for holes in the rigid body may also result in a lower cost device.

As most computing devices have a rigid body, the force-based inputs may be standardized across a large range of devices of different types, from different manufacturers and for operation in different languages etc. In an example, the force-based inputs may be used for standard basic commands which are common across many devices such as 'Escape', 'Back', 'Copy', 'Paste', 'Alt-Tab' and 'Start menu'.

Use of force-based inputs does not require manual dexterity and is intuitive. This therefore provides an input which may be used by any user, including small children who may be unable to type.

Although the present examples are described and illustrated herein as being implemented in a computer-based system, the system described is provided as an example and not a limitation. As those skilled in the art will appreciate, the present examples are suitable for application in a variety of different types of consumer products and the force based input methods described above may be used to control the operation of any type of device. In another example, the user inputs may be used to control a device which is implemented in hardware (e.g. to control an alarm clock).

Whilst the body to which the user applies forces is are described as being rigid, or substantially rigid, the body may comprise hinges, folds or non-rigid portions which connect rigid portions of the device together. Where, for example, the device comprises two substantially rigid portions connected by a hinge, a user may apply the forces to the device in the folded open or folded closed configuration.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A system comprising:
a rigid body with a first edge and a second edge, the first edge being parallel to the second edge;
at least one force sensor;
an analyzer arranged to determine a resultant force applied to the rigid body based on outputs from the at least one force sensor; and
a mapping module arranged to map the resultant force to a user input to the system, the resultant force comprising:
a first rotational force applied to the first edge of the rigid body; and
a second rotational force applied to the second edge of the rigid body, the first rotational force and the second rotational force being applied in opposite directions along a latitudinal axis of the rigid body that is perpendicular to the first edge and the second edge.

2. A system according to claim 1, wherein the system is a computing device, the rigid body comprises a rigid case of the computing device and the user input is a user input to a software program running on the device.

3. A system according to claim 1, further comprising:
a proxy device comprising the rigid body and the at least one force sensor; and
a computing device having a display and arranged to run a software program, and wherein the user input is a user input to the software program.

4. A system according to claim 3, wherein the proxy device comprises a cover for the computing device.

5. A system according to claim 1, further comprising:
a display;
a processor; and
memory,
wherein the analyzer comprises executable instructions stored in the memory arranged, when executed, to cause the processor to determine the resultant force applied to the rigid body based on outputs from the at least one force sensor, and
wherein the mapping module comprises executable instructions stored in the memory arranged, when executed, to cause the processor to map the resultant force to a user input to a software program.

6. A system according to claim 1, further comprising:

feedback means for providing feedback to a user when a force detected using the at least one force sensor exceeds a threshold.

7. A system according to claim 1, further comprising:

feedback means for providing a feedback signal to a user following mapping of a resultant force to a user input, and wherein the mapping module is further arranged to trigger the feedback signal.

8. One or more tangible device-readable media with device-executable instructions for performing acts comprising:

detecting forces applied to a rigid body including a polymer sheet, a light source, and a light detector;

determining a resultant force on the rigid body based in part on an amount of rotation of polarization of light from the light source passing through the polymer sheet that is detected by the light detector; and identifying a user input based on the resultant force.

9. One or more tangible device-readable media according to claim 8, wherein the user input has a magnitude dependent upon a magnitude of the resultant force.

10. One or more tangible device-readable media according to claim 8, further comprising controlling a software program using the user input.

11. One or more tangible device-readable media according to claim 8, wherein the rigid body comprises a body of a computing device and the user input comprises a user input to a software program running on the device.

12. One or more tangible device-readable media according to claim 11, wherein the software program comprises one of an operating system and application software.

13. A method comprising:

detecting a resultant force occurring in a rigid body of a device due to a plurality of user applied forces, the forces related to pulling opposing ends of the rigid body device away from each other;

mapping the resultant force to a user input to the device; and defining the resultant force in terms of a set of input force actions, wherein mapping the resultant force to the user input to the device comprises mapping the resultant force to the user input based on a definition of the resultant force in terms of the set of input force actions and based on a magnitude of the resultant force.

14. A method according to claim 13, further comprising:

determining a derived resultant force from the detected resultant force, wherein the derived resultant force is mapped to the user input to the device.

15. A method according to claim 13, further comprising:

determining if the resultant force exceeds a threshold; and performing the mapping only if the threshold is exceeded.

16. A method according to claim 13, further comprising:

determining if any component of the resultant force exceeds a second threshold; and providing feedback to a user if the second threshold is exceeded.

17. A method according to claim 13, further comprising:

providing feedback to a user following mapping of the resultant force to the user input.

18. A method according to claim 13, further comprising:

performing an action in a software program in response to the user input, wherein the action has an associated visualization that is representative of the resultant force.

19. A method according to claim 13, wherein the mapping is dependent on at least one of a direction and a magnitude of the resultant force.

\* \* \* \* \*